United States Patent Office 3,513,943
Patented May 26, 1970

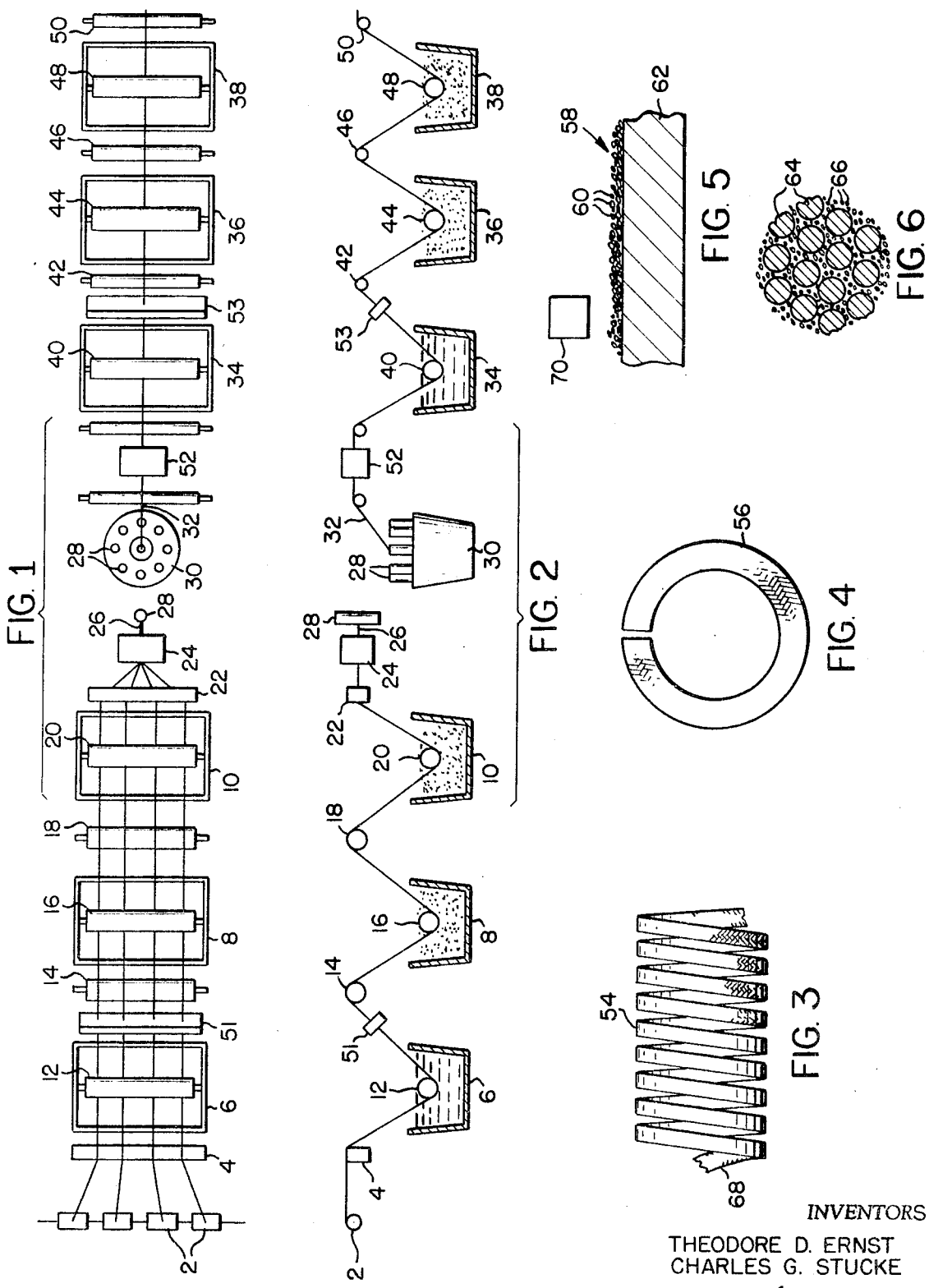

3,513,943
POROUS PACKING MATERIAL CONTAINING PRESSURE AND/OR HEAT SENSITIVE ENCAPSULATED LUBRICANT AND METHOD FOR MAKING AND USING THE SAME
Theodore D. Ernst, Waterloo, and Charles G. Stucke, Palmyra, N.Y., assignors to Garlock, Inc., Palmyra, N.Y., a corporation of New York
Filed Apr. 17, 1968, Ser. No. 722,026
Int. Cl. F16n 15/00
U.S. Cl. 184—1   18 Claims

ABSTRACT OF THE DISCLOSURE

The useful lifetime of machinery packing is extended by incorporating lubricant-containing capsules of minute size in the packing material. When excessive pressures and/or temperatures develop in the packing during operation, such as might result from gland takeup, other adjustment or material expansion, the capsules break and supply lubricant to the dynamic interfaces.

BACKGROUND OF THE INVENTION

This invention relates to encapsulated lubricants and their use and to packing material containing the same and to methods of making and using such packing material.

Braided packing is used in stuffing boxes of machinery for packing a rotary shaft or a reciprocating rod at a point where a shaft or rod extends through an opening into a part of a machine containing a fluid to be held therein against escape. Conventional textile packing or composite semi-metallic and textile packing as used commercially, generally consists of certain textile fibers such as flax, jute, cotton, asbestos, graphite and other materials. Braided packings are manufactured from yarns and rovings of these textile fibers in different sizes for use with piston rods, plungers, rotating shafts, valve stems or other moving mechanical parts. Such packings are presently impregnated with lubricating compounds and other materials to reduce friction and to produce a seal.

In the usual application of packing material, pressure is maintained on the packing to cause the packing to deform or flow as is necessary in order that it will continuously conform to the surfaces with respect to which it is to form a seal. In a stuffing box, pressure is maintained on the packing by the bonnet or gland and when the packing is used as a gasket, pressure is maintained on it by bolting or otherwise clamping the gasketed parts together. In the course of service, due to wear and/or aging of the packing, applied pressure diminishes. To compensate for this, the gland in the case of stuffing boxes, or the bolting in the case of gaskets, is periodically adjusted to compress the packing and to restore the applied pressure to a suitable value.

Packing often burns and fails at start-up or after gland take-up because of lack of sufficient lubrication at the dynamic interfaces to reduce the high friction caused by the excessive axial and radial compressive forces resulting from gland adjustment or from material expansion.

SUMMARY OF THE INVENTION

According to the present invention, the above problems in the prior art are solved by adding lubricant-containing capsules of minute size to the packing. Such capsules are designed to remain intact during normal operating conditions but to rupture once a predetermined value of pressure and/or heat is generated in the packing. The capsules can be added for example, by dipping after braiding, by vacuum impregnating or by adding during fabrication. The capsules can be heat and/or pressure sensitive (rupturable). A large number of known lubricants are made useful in the present invention by being encapsulated in any number of cell wall materials according to known processes of encapsulation.

It is an object of the present invention to provide lubrication at the dynamic interfaces of packing whenever excessive pressures and/or heat develop at such interfaces thereby extending the useful lifetime of the packing.

It is another object of the invention to provide lubricant-containing capsules and to provide a method of lubricating a particular surface under predetermined future conditions.

BRIEF DESCRIPTION OF THE DRAWINGS

Other objects and advantages of this invention will be particularly set forth in the claims and will be apparent from the following description:

FIGS. 1 and 2 are respectively, a diagrammatic top plan view and a side elevation view of an apparatus for making braided packing according to the present invention;

FIG. 3 is a side view of braided packing wound in a spiral coil;

FIG. 4 shows a length of the braided packing of FIG. 3 formed into a single ring for use as a packing;

FIG. 5 is a greatly enlarged cross-sectional view through a layer of material, such as braided packing, covered with a layer of lubricant-containing capsules, and FIG. 6 is a greatly enlarged cross-sectional view through a braided packing made according to the present invention and showing a quantity of lubricant-containing capsules incorporated therein.

DESCRIPTION OF THE PREFERRED EMBODIMENTS

The following description will be directed initially to the application of encapsulated lubricants to braided packings of the type shown for example, in U.S. Pats. 2,107,661, 2,020,844, 716,836, and 3,124,032. Since braided packings and methods of making braided packings are well-known in the art they need not be described in detail here. The lubricant-containing capsules of the present invention can be made by the processes shown and described for example, in U.S. Pats. Nos. 2,800,457, 2,800,458, and 3,401,289, issued July 23, 1957, July 23, 1957, and June 26, 1962 respectively and assigned to The National Cash Register Company of Dayton, Ohio. Processes for the micro-encapsulation of various materials have become well known in recent years.

Any of several methods can be used to apply lubricant-containing capsules to braided packing. For example, the individual strands or twisted strands of yarn, to be used in braiding, can be passed through a bath of emulsion of encapsulated lubricant and water to cause impregnation. The impregnated strand can be wound onto spools or packages for fabrication on a braider while still damp. Ths process would place the encapsulated lubricant through-out the braided structure of the packing. The impregnated braid would then be dried. Alternatively, braided material can be passed through a bath of emulsion of encapsulated lubricant and then dried. This process would deposit impregnation mainly on the surface of the braid. By immersing the braid in a tank of encapsulated lubricant and allowing the material to soak, a slightly deeper penetration of the lubricant can be produced. Also, by using a vacuum process, a deeper penetration of the encapsulated lubricant emulsion, will be produced. The braid is placed in an autoclave on which is drawn a high vacuum. While under vacuum the encapsulated lubricant emulsion is allowed to enter sufficient to cover the braid. Next, positive air pressure is introduced to drive the emulsion into the center of the braid. The material is then wiped and dried. The encapsulated lubricant can also be applied by the paste method of U.S. Pat. No. 3,124,032 in which a thick bodied paste of encapsulated lubricant emulsion and water is prepared. This paste is applied to the braiding yarn strands immediately below the braid forming die. The interweaving strands closing in at the die in the presence of the impregnating paste will become wet with emulsion throughout the body of the braid. The impregnated braid is then dried.

FIGS. 1 and 2 are somewhat diagrammatic views of an apparatus for producing braided packing according to the present invention. A plurality of fibrous strands wound on a number of reels 2, are passed sequentially through a guide 4, and then through several containers or tanks 6, 8, and 10 by means of rollers 12, 14, 16, 18, and 20. From the last tank 10 the strands are drawn through a guide 22, and into a twisting device 24 (schematically shown) which produces a single multi-ply rope or composite strand 26 wound on a suitable bobbin 28.

The bobbin 28 is such as is suitable for use in known types of braiding machines shown diagrammatically at 30. After braiding, the braided packing 32 is given a die or roller operation as shown diagrammatically at 52, and then drawn sequentially through tanks 34, 36, and 38 by means of rollers 40, 42, 44, 46, 48 and 50.

As is known in the art the tank 6 is used to apply a suitable binder to the fibrous strands, while the second tank 8 is used to apply to the strands a dry mixture such as powdered graphite. Similarly, after braiding, one may optionally apply a second coating of binder and graphite in tanks 34 and 36 respectively.

The binder applied from tank 6 should be dried somewhat before the strands are dipped in tanks 8 and 10; this is accomplished by a suitable heater 51 through which the strands pass. Similarly, a heater 53 is provided for braid 32 before it passes into tank 36.

According to the preferred embodiment of the present invention, the known process of making braided packing is modified so as to impregnate the braided packing with encapsulated lubricant. FIGS. 1 and 2 illustrate one method of accomplishing the impregnation. The individual fibrous strands are drawn through the tank 10 which contains a quantity of lubricant-containing capsules. Each strand is exposed to the capsules which mechanically adhere to the surface thereof usually in a layer less than 2 capsules thick. After braiding the braided packing 32 is drawn through the tank 38 which also contains a quantity of lubricant-containing capsules. It is not essential to this invention that the capsules be applied twice as shown in FIGS. 1 and 2. Tank 38 could be eliminated, for example.

FIG. 3 shows a coil 54 and FIG. 4 shows a gasket 56 of braided packing made according to the present invention. FIG. 5 diagrammatically illustrates a layer 58 of individual capsules 60 adhering to a surface (such as a single fibrous strand) of an element 62 to be lubricated. FIG. 6 is a greatly enlarged cross-sectional view through a braided packing such as at 68 of FIG. 3 made according to the present invention showing the individual strands 64 and a quantity of lubricant-containing capsules 66 operatively associated with the strands 64, for example by being thoroughly impregnated into the interstices of the braided packing.

The capsules can be such as to all rupture when a certain value of temperature and/or pressure is reached or alternatively some capsules can be rupturable for example at one temperature, others at a second temperature (say 25° F. higher than the first temperature) and so on.

The present invention is equally applicable to products other than braided packing. It is especially useful for devices which require lubrication and which are relatively inaccessible. According to the present invention, the lubrication of the device can be automatically achieved even though the device is completely inaccessible. For example, with respect to braided packing, it is known that the packing may undergo certain conditions of pressure and temperature which could be deleterious to the further usefulness of the packing, and that when these conditions occur the packing is inaccessable. However, according to the present invention, lubrication is provided and is provided automatically. This invention is applicable even where the surface never reaches unusually high temperatures or pressures under operating conditions. In such case the predetermined high pressure or temperature can be controlled externally to control lubrication when desired. This is especially useful when the surface is inaccessible and it would take time to dismantle the equipment, shut it down and lubricate the surface. Heat or pressure can be applied at will be employing, for example, a separate heating element (such as a heater 70 in FIG. 5) operatively associated with the capsules such that by activating it externally the capsules can be ruptured at will thus releasing lubricant to lubricate the device. The capsules can be made vibration sensitive (rupturable) whereby the application of ultrasonic energy can be used to break the capsules and release the lubricant.

Various types of lubricants are known and the present invention contemplates the use of all such known lubricants, including silicones, mineral oils, and polysiloxane. The presently preferred lubricants are those which contain silicone oil. The preferred cell wall materials for the capsules include gelatin and various polymer materials such as polyvinyl chloride. The presently preferred size range for the capsules of minute size of the present invention is 3 to 23 microns, although, as is known by those skilled in the art, capsules of minute, size can vary in size from microscopic to a fraction of an inch in diameter. Since the capsule size is related to the pressure at which it will rupture, by controlling the size of the capsule the rupture pressure of the capsules can be controlled.

The present invention contemplates using both individual capsules and conglomerations of capsules. The method of adherence of the capsules to the braiding as shown in FIG. 4, is simply mechanical adherence or use of a binder. Other methods can be employed such as coating or mixing the capsules with an adhesive which mixture is then applied to the material to be lubricated. Although FIGS. 1 and 2 show applying the encapsulated lubricant to the packing by use of dip tanks, other methods can be used such as vacuum impregnation or the process described in U.S. Pat. No. 3,124,032.

While we have described the preferred form of our invention it will be apparent that various modifications and changes may be made therein, without departing from the spirit of our invention as set forth in the appended claims.

We claim:

1. An article comprising:
   (a) a packing material including a quantity of a first lubricant therein, and
   (b) a quantity of lubricant-containing capsules of minute size in addition to said first lubricant and operatively associated with said packing material.

2. The article according to claim 1 wherein said capsules do not rupture under conditions of pressure and temperature existing in said packing as long as said first lubricant supplies sufficient lubrication to said packing, and wherein said capsules do rupture under conditions of excessive temperature and pressure existing in said packing when said first lubricant fails to supply sufficient lubrication to said packing, whereby the useful lifetime of said packing is extended.

3. The article according to claim 2 in which said packing material is braided packing.

4. The article according to claim 3 in which the lubricant in said capsules comprises polysiloxane.

5. The article according to claim 3 in which said capsule comprises a cell wall of polyvinyl chloride encapsulating said lubricant.

6. An article comprising:
   (a) a body including a quantity of a first lubricant therein, and
   (b) a quantity of lubricant-containing capsules of minute size in addition to said first lubricant, and operatively associated with said body, said capsules being rupturable to supply additional lubrication to said body only after said first lubricant fails to supply sufficient lubrication to said body.

7. The article according to claim 6 in which said body is a porous body.

8. The article according to claim 7 in which said capsules are adapted to rupture under predetermined conditions of at least one of heat and pressure.

9. The article according to claim 6 including means for rupturing said capsules.

10. The method of lubricating a body of the type requiring lubrication and having a quantity of a first lubricant therein comprising:
    (a) applying to said body, in addition to said first lubricant, a quantity of lubricant-containing capsules which are rupturable to supply additional lubrication to said body only when said first lubricant fails to supply sufficient lubrication to said body.

11. The method of treating packing material having a quantity of a first lubricant therein comprising:
    (a) applying to said packing material, in addition to said first lubricant, a quantity of lubricant-containing capsules, said capsules being rupturable only when said first lubricant fails to supply sufficient lubrication to said packing material.

12. The method according to claim 11 in which said packing material is braided and in which said applying step comprises impregnating said braided packing material with said capsules.

13. The method according to claim 12 in which said impregnating step includes the step of coating the individual strands of said braided packing material with said capsules.

14. The method according to claim 11 wherein said failure of said first lubricant results in excessive temperature and wherein said capsules rupture when exposed to said excessive temperature.

15. An article comprising:
    (a) a packing material;
    (b) a first lubricant incorporated in said packing material and being continuously available, until depletion, for lubricating said packing material, and
    (c) a quantity of lubricant-containing capsules of minute size incorporated in said packing material, said capsules rupturing and releasing supplemental lubricant to said packing material only upon demand by said packing material for additional lubrication.

16. The article according to claim 15 wherein said demand is evidenced by excessively high temperature in said packing material and wherein said capsules are rupturable upon being exposed to said excessively high temperature.

17. The method of extending the life of lubricated packing material having a quantity of a continuously available lubricant incorporated therein, comprising:
    adding to said packing material a quantity of lubricant-containing capsules of minute size, said capsules rupturing to supply supplemental lubricant to said packing material only upon demand by said packing material for additional lubrication.

18. The method according to claim 17 including supplying additional lubricant to said packing material from said capsules in response to excessively high temperature in said packing material.

References Cited
UNITED STATES PATENTS

| | | | |
|---|---|---|---|
| 1,088,252 | 2/1914 | Anderberg | 252—10 |
| 2,716,034 | 8/1955 | Main | 87—1 |
| 2,924,876 | 2/1960 | Lewis | 184—1 XR |
| 2,949,424 | 8/1960 | Mandelcorn et al. | 251—1 |
| 3,116,206 | 12/1963 | Brynko et al. | 252—316 XR |
| 3,124,032 | 3/1964 | Webster et al. | 87—23 XR |
| 3,189,542 | 6/1965 | Morway et al. | 252—49.6 XR |
| 3,317,433 | 5/1967 | Eichel | 252—10 XR |

FRED C. MATTERN, JR., Primary Examiner

M. A. ANTONAKAS, Assistant Examiner

U.S. Cl. X.R.
87—1; 252—10